(12) United States Patent
Radke et al.

(10) Patent No.: US 10,189,108 B2
(45) Date of Patent: Jan. 29, 2019

(54) HOT-WIRE WELDING ASSEMBLY FOR DEEP AND NARROW RECESSED GAPS

(71) Applicant: Lincoln Global, Inc., City of Industry, CA (US)

(72) Inventors: Maxwell Radke, Lyndhurst, OH (US); Michael Latessa, Chesterland, OH (US)

(73) Assignee: Lincoln Global, Inc., City of Industy, CA (US)

( * ) Notice: Subject to any disclaimer, the term of this patent is extended or adjusted under 35 U.S.C. 154(b) by 828 days.

(21) Appl. No.: 14/821,328

(22) Filed: Aug. 7, 2015

(65) Prior Publication Data
US 2017/0036294 A1    Feb. 9, 2017

(51) Int. Cl.
| B23K 9/02 | (2006.01) |
| B23K 9/28 | (2006.01) |
| B23K 9/173 | (2006.01) |
| B23K 9/29 | (2006.01) |
| B23K 9/12 | (2006.01) |
| B23K 9/26 | (2006.01) |

(52) U.S. Cl.
CPC .......... B23K 9/287 (2013.01); B23K 9/0213 (2013.01); B23K 9/12 (2013.01); B23K 9/173 (2013.01); B23K 9/26 (2013.01); B23K 9/295 (2013.01)

(58) Field of Classification Search
CPC ........ B23K 9/0213; B23K 9/285; B23K 9/02; B23K 9/24; B23K 9/28; B23K 9/295
USPC ................ 219/74, 130, 136, 137.42, 137.61
See application file for complete search history.

(56) References Cited

U.S. PATENT DOCUMENTS

| 3,265,856 A | 8/1966 | Shelby | |
| 3,536,885 A | 10/1970 | Mitchell | |
| 3,576,423 A | 4/1971 | Bernard | |
| 3,610,875 A | 10/1971 | Molin | |
| 3,629,547 A | 12/1971 | Kester | |
| 3,676,640 A | 7/1972 | Bernard | |
| 3,783,233 A | 1/1974 | Dal | |
| 3,826,888 A | 7/1974 | Garfield | |
| 3,878,354 A | 4/1975 | Frantzreb | |
| 4,105,891 A | 8/1978 | Hill | |
| 4,309,590 A | 1/1982 | Stol | |
| 4,591,685 A | 5/1986 | Hinger | |
| 4,954,683 A | 9/1990 | Hatch | |
| 5,074,802 A | 12/1991 | Gratziani | |
| 5,373,139 A | 12/1994 | Burgoon | |
| 5,384,447 A | 1/1995 | Raloff | |
| 5,721,417 A | 2/1998 | Craig | |
| 5,760,373 A | 6/1998 | Colling | |
| 5,900,167 A * | 5/1999 | Rudnicki | B23K 9/295 219/136 |
| 6,127,651 A * | 10/2000 | Burgoon | B23K 9/1093 219/137 R |
| 6,156,995 A | 12/2000 | Severance, Jr. | |
| 6,163,008 A | 12/2000 | Roberts | |

(Continued)

*Primary Examiner* — Brian W Jennison
(74) *Attorney, Agent, or Firm* — Perkins Coie, LLP

(57) ABSTRACT

A contact tip for hot-wire welder is provided that are adapted to operate in deep and narrow recessed gaps within a work piece. Contact tips in accordance with the current invention provide for an assembly having a body portion with a cavity and an extension portion which is inserted into the cavity. The extension portion is non-electrically conductive and allows the contact tip assembly to reach into deep, narrow grooves without worry of shorting the contact tip of the consumable.

20 Claims, 5 Drawing Sheets

(56) References Cited

U.S. PATENT DOCUMENTS

| | | |
|---|---|---|
| 6,271,495 B1 | 8/2001 | Rooney |
| 6,307,179 B1 | 10/2001 | Walters, III |
| 6,683,279 B1 | 1/2004 | Moerke |
| 6,946,616 B2 | 9/2005 | Kinerson |
| 7,071,443 B2 | 7/2006 | Conway |
| 2009/0045183 A1 | 2/2009 | Artelsmair |
| 2009/0152255 A1 | 6/2009 | Ma |

* cited by examiner

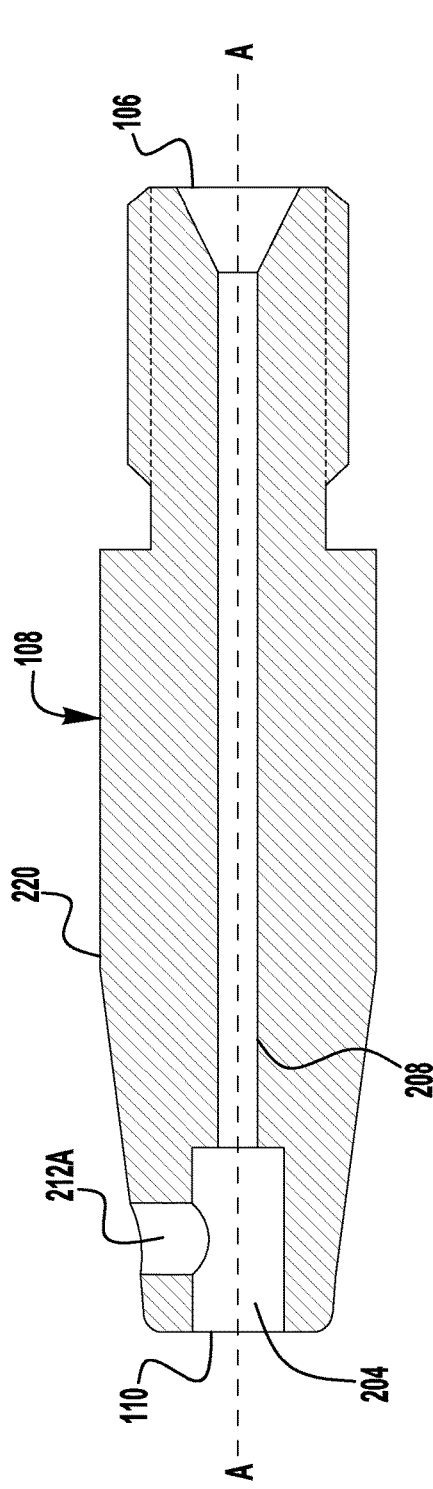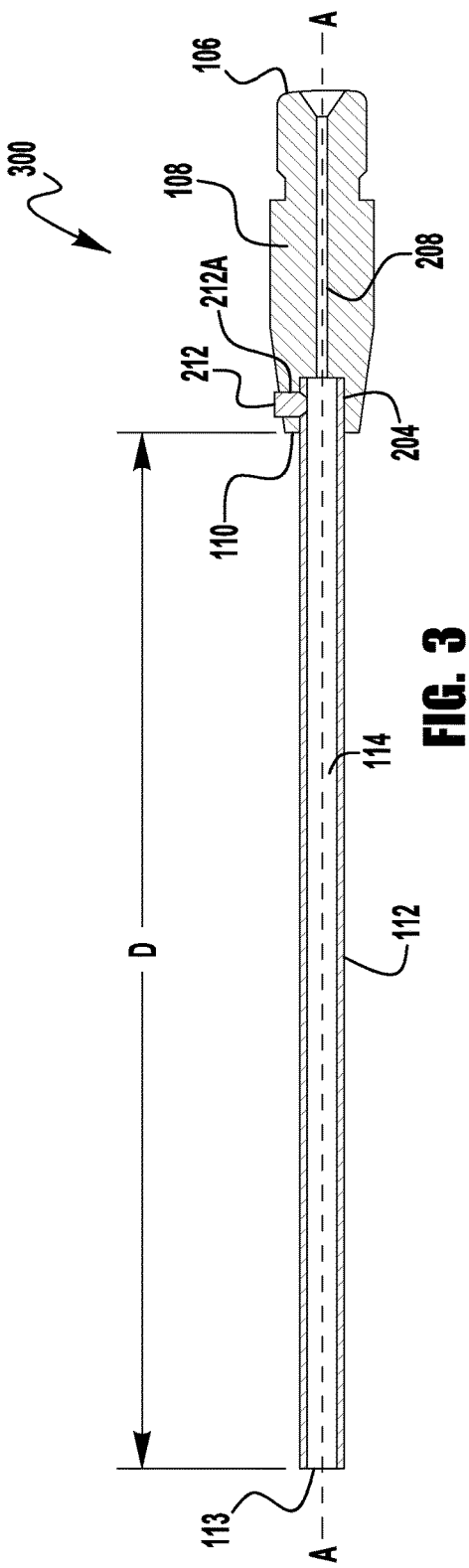

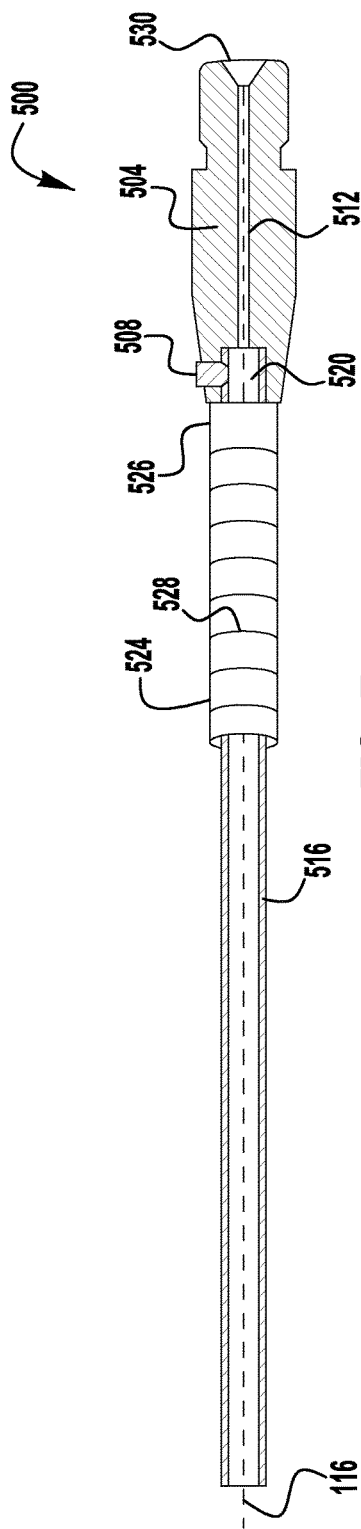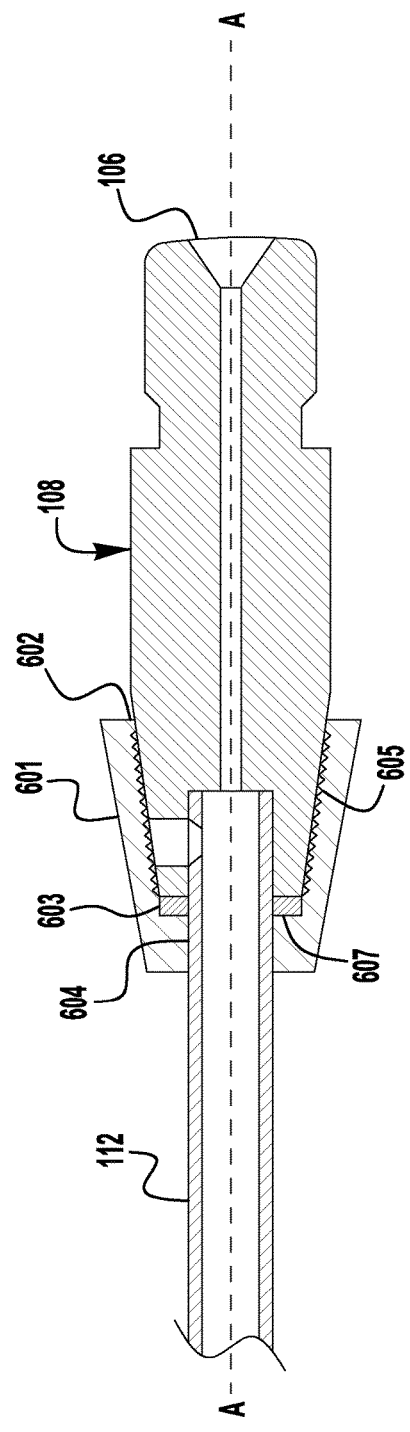

HOT-WIRE WELDING ASSEMBLY FOR DEEP AND NARROW RECESSED GAPS

FIELD OF THE INVENTION

The present invention generally relates to welding processes, equipment and materials. More particularly, this invention relates to a welding method and apparatus adapted for narrow groove welding to facilitate a welding operation in deep and narrow recessed portions of a work piece.

BACKGROUND OF INVENTION

In some scenarios, it may be economically more effective to repair metal components that have suffered cracks and damages, rather than replace them completely. One such repair technique is referred to as narrow groove welding or narrow gap welding in the art. In such a type of welding, the welding operation is typically performed in deep and recessed portions of a work piece. Narrow groove welding may also be beneficial when joining work pieces with thick walls. Normally, narrow groove welding is carried out by an arc welding process. In a conventional arc welding process, a continuous length of welding wire is fed into an arc welding torch. The welding torch passes the welding wire and a contact tip located at one end of the welding torch guides the welding wire to the weld joint. The welding wire acts as a consumable electrode and is fused into an electric arc. The electric arc is created between the welding wire and the base material and melts the metals at the weld joint.

There have been attempts to make narrow groove welds in the past. However, almost all such attempts are subjected to severe challenges. One such challenge is shorting of the welding wire when it comes in contact with the sidewall of the narrow groove. To tackle this problem, the welding wire has to be fed extremely straight into the contact tip so that the welding wire does not touch the sidewalls. This is difficult to achieve in practice, especially, with fine welding wires. Another challenge is that the length of the welding wire (commonly referred to as stick out) can be rather long, e.g., exceed three inches, causing the welding wire to bend. A welding wire that is bent can be very cumbersome and difficult to control during a welding operation. Furthermore, a long stick out increases the tendency for spurious arcing to occur between the welding wire being fed down into the narrow groove and the side walls of the narrow groove.

To make matters worse, current embodiments of the contact tip are traditionally short in length, and are made of a good electrical conductor, typically copper. This creates a two-fold problem when welding in deep and narrow recessed environments. The first problem is that the inadequate length of the contact tip does not allow the contact tip to reach into narrow and recessed portion of a weld joint of a work piece. This problem becomes much more severe in scenarios wherein the weld joint is narrower than the contact tip. The second problem is that, because the contact tip is typically constructed from a material that is a good conductor of electricity, any contact with the surrounding wall of the recessed portion creates a short in the system. For these aforementioned reasons there exists a need to create an assembly that allows for welding in deep and narrow recessed gaps within a work piece.

BRIEF SUMMARY OF THE INVENTION

The current disclosure provides contact tips for hot-wire welders that are adapted to operate in deep and narrow recessed gaps within a work piece. Contact tips in accordance with the current invention provide for an assembly that is able to both overcome the reach disadvantage of traditional contact tips and welding, and also avoid shorting the system in the event that the contact tip comes in contact with the surrounding wall of the deep and narrow recessed gap of the work piece. Consequently, aspects of the present disclosure provides for savings in both time and costs in labor and materials over conventional contact tips.

Briefly, one embodiment of the current invention, comprises a welding assembly with a contact tip that can receive an extension tube. The extension tube is secured to the contact tip via a fastener and the extension tube guides the welding wire into a deep and narrow recessed gap. The extension tube can be made of insulating material such as ceramic, and consequently protects the welding wire from coming into contact with the side wall of the gap, thus avoiding a short. It will be appreciated by those skilled in the art that there exists other such materials other than ceramic that can accomplish the same task that this embodiment of the invention seeks to accomplish, and are incorporated within the scope of the invention.

BRIEF DESCRIPTION OF THE DRAWINGS

The above and/or other aspects of the invention will be more apparent by describing in detail exemplary embodiments of the invention with reference to the accompanying drawings, in which:

FIG. 2 is a side cross-sectional view of the contact tip in accordance with an exemplary embodiment of a welding assembly;

FIG. 3 is a side cross-sectional view of an extension tube fastened to the contact tip shown in FIG. 2, in accordance with an exemplary embodiment of a welding assembly;

FIG. 5 illustrates a side cross-sectional view of a different embodiment of a welding assembly showing an extension tube including a heating mechanism, in accordance with an exemplary embodiment of a welding assembly; and FIG. 6 illustrates a cross-sectional side view of a further exemplary embodiment of the present invention.

DETAILED DESCRIPTION OF EXEMPLARY EMBODIMENTS

Figure 1A:
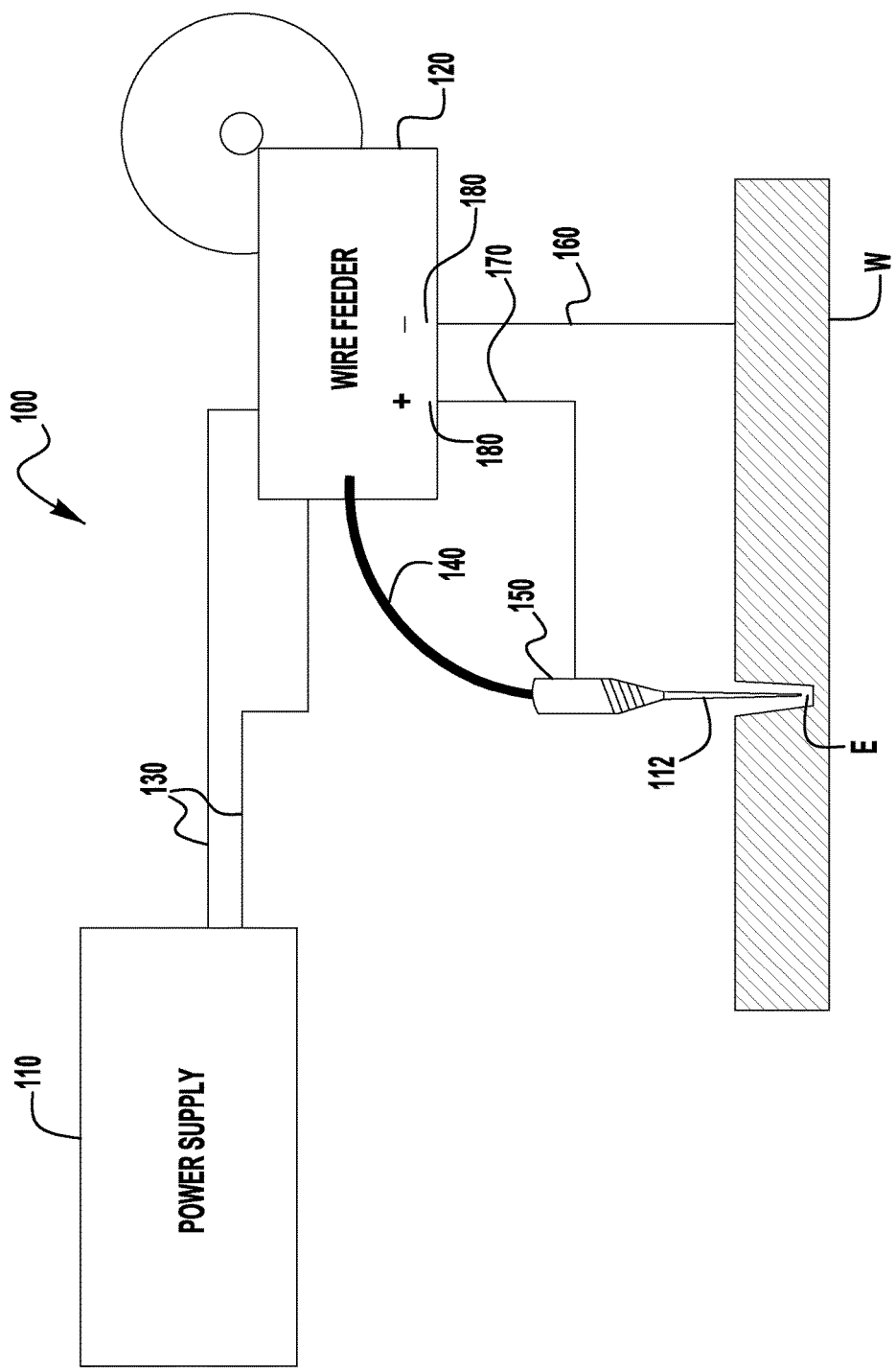
FIG. 1A illustrates a diagrammatical representation of an overall welding system in accordance with an exemplary embodiment.

Exemplary embodiments of the invention will now be described below by reference to the attached figures. The described exemplary embodiments are intended to assist the understanding of the invention, and are not intended to limit the scope of the invention in any way. Like reference numerals refer to like elements throughout.

Turning now to the figures of the present application, FIG. 1 depicts an exemplary hot-wire welding system 100 in accordance with an embodiment of the present invention. Because hot-wire welding systems and methods are generally known, the details of their construction and operation will not be discussed herein, as they are understood by those of ordinary skill in the art. As is typical, the system 100 contains a power supply 110 coupled to a wire feeder 120 via cables 130. The power supply 110 outputs a current, which is directed to the wire feeder 120 so that the wire feeder can pass the current on to the electrode E (alternatively, referred to herein as a welding wire or consumable) for welding the work piece W. In an exemplary embodiment, the power supply 110 receives an AC signal as its input (not shown in FIG. 1). The AC signal can be received as a 3-phase input, or a single phase AC input signal. The AC signal can vary in voltage and frequency depending on the source of power and/or the country of operation. For example, the AC input can be from a utility grid—which can range from 100 to 660 volts at 50 or 60 Hz—or can be from a portable generator, which can also have a varying voltage and frequency. Thus, the system 100 is capable of operating properly and providing a welding signal regardless of the input AC voltage magnitude, phase type and frequency. The power supply 110 can be designed to run in various modes including constant voltage (CV) and constant current (CC) modes, etc., as suitable in various applications. Thus, the power supply 110 can include additional electrical components to condition the raw AC signal received and output the desired welding signal. The output signal or welding signal can either be DC or AC, depending on the application and desired output. Further, the construction and operation of the power supply 110 for hot wire applications is generally known and need not be described in detail herein.

A wire feeding cable 140 delivers the electrode E to a torch assembly 150, which imparts the welding current from power supply 110 into the electrode E via a welding cable 170. Although the cable 170 is shown separate from the cable 140, it is known that the cable 170 can be internal to the housing of the cable 140. A ground cable 160 is also coupled to the work piece W. Each of the power cables 170 and 160 are connected to the wire feeder 120 via power studs 180. The welding signal which is received from the power supply 110 is provided to the cables 160/170 via the output studs 180. Typically, sense leads are used to sense a voltage and/or a current of the welding arc to allow for proper control of the welding operation. The sense leads are electrically coupled to the work piece W and the torch assembly 150 to provide feedback regarding the voltage and current of the arc. This feedback is used by the power supply 100 to control the creation and output of the welding signal.

It is noted in FIG. 1A that according to embodiments of the present disclosure, the torch assembly 150 includes a contact tip 108 and an extension tube 112 for guiding the welding wire into the narrow groove. In some embodiments, a cavity inside a body portion of the contact tip 108 receives the extension tube 112. Therefore, in exemplary embodiments of the present invention, which will be discussed in more detail below, the extension tube 112 is shaped such that the welding wire 116 can be fed to a bottom of a weld joint during a welding operation in which the largest gap of the weld joint is narrower than the smallest outside diameter of the contact tip 108, for example as shown in FIG. 1A. As described later, (not shown in FIG. 1A) the contact tip 108 further comprises a channel passing through the body portion along an axis of the contact tip 108. In some embodiments, the channel passes from one end of the contact tip 108 to the other end of the contact tip 108. In some other embodiments, the channel passes from one end of the contact tip 108 to the cavity included inside the body portion of the contact tip 108. It will be appreciated that contact tips in accordance with aspects of the current disclosure provide for an assembly that is able to both overcome the reach disadvantage of traditional contact tips, and also avoid shorting the system in the event that the contact tip comes in contact with the surrounding wall of the deep and narrow recessed gap of a work piece. In some embodiments, the extension tube 112 can be made of electrically insulating material such as ceramic. In other embodiments, the electrically insulating material can be a high temperature polymer, glass, or any other non-metallic, non-conductive material which can withstand the temperatures of the process.

Figure 1B:
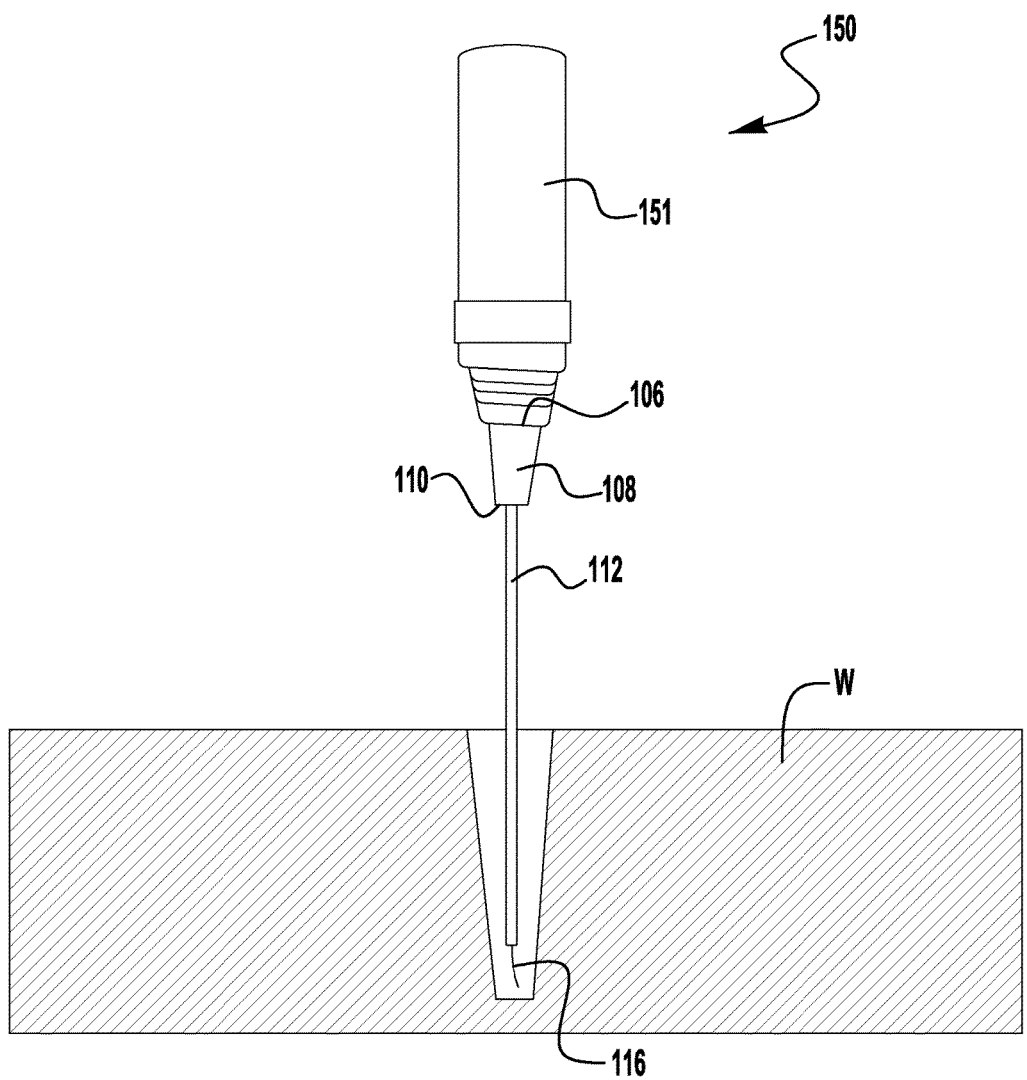
FIG. 1B is an exploded view of the contact tip operating in a deep and narrow recessed gap in accordance with an exemplary embodiment of a welding assembly.

FIG. 1B is an further view of an embodiment of the torch assembly 150 shown in FIG. 1A operating in a deep and narrow recessed gap of a work piece W (or a gap between two work pieces). It is shown that the torch assembly 150 includes a torch body portion 151 that receives the contact tip 108 and the contact tip 108 receives an extension tube 112 for guiding the welding wire 116. The contact tip 108 has a proximal end 106—which couples the tip 108 to the torch body 151—and a distal end 110—to which the tube 112 is coupled—such that the extension tube 112 guides the welding wire 116 to the weld joint. Further, as shown in FIG. 1B, the extension tube 112 is shaped such that the welding wire 116 can be fed to a bottom of a weld joint of a work piece W (or a weld joint between two work pieces) during a welding operation wherein the weld joint is narrower than the contact tip 108. In exemplary embodiments, the tube 112 can have a circular cross-section, while in other embodiments, the cross-section can be elliptical, oval, airfoil shape, etc.

FIG. 2 is a side cross-sectional view of an exemplary embodiment of the contact tip 108 shown in FIG. 1B. As shown in FIG. 2, the tip 108 has a proximal end 106 and a distal end 110 opposite the proximal end 106 along an axis AA running through the tip 108. The proximal end is coupled to the torch body 151 and can be configured as desired to properly secure to a torch body. For example, the proximal end 106 can have threads to create a threaded connection. Other configurations can also be used. As shown, a cavity 204 is included within the tip 108 that extends partially from the distal end 110 into the tip 108 along the axis AA. In exemplary embodiments, the length of the cavity ranges from 0.25 to 0.75 inches. However, it should be noted that the length of the cavity 204 can be any length which provides for the stability of the extension tube. In fact in some embodiments, the cavity 204 can be in the range of 50 to 100% of the length of the contact tip. Further, it is shown in FIG. 2 that the contact tip 108 comprises a channel 208 passing through the tip 108 along the axis AA from the proximal end 106 toward the distal end 110. The channel 208 is used to guide the wire 116 through the tip 108 and has a diameter which is sufficiently larger to allow the wire 116 to pass through easily, but also maintain electrical contact between the walls of the channel 208 and the wire 116 during the wire feeding process. This ensures that the current adequately passes from the contact tip 108 to the wire 116. As shown, the cavity 204 at the distal end 110 of the tip 108 has a diameter or size which is larger, in cross-section, than the diameter or size of the channel 208. It is noted that while the shown embodiments use a cavity 204 with a circular cross-section, other embodiments are not limited in this regard, and other cross-sectional shapes can be used. In exemplary embodiments, the cavity 204 has a diameter in the range of 2 to 3 times the diameter of the channel 208. The cavity 204 should be designed such that it allows for the sufficient securing of the tube 112 to the tip 108.

An extension tube 112 (not shown in FIG. 2) can be coupled to the cavity 204 for guiding the welding wire past the second end 110 of the tip 108 and deep into a narrow groove. That is, a proximal end of the tube can be inserted into the cavity such that a channel within the tube aligns with the channel 208 to allow the wire 116 to pass from the tip 108 to the tube 112 and ultimately to the workpiece. The cavity 204 should be configured such that the tube can be securely attached to the tip 108. For example, in exemplary embodiments, a hole 212A is provided within the tip 108 for accepting, e.g., a fastening portion 212 (see FIGS. 3 and 4) that can secure the extension tube 112 to the body portion 108. Examples of a fastening portion 212 can include bolts, screws, rivets, lock washers, studs, pins, nuts, retaining rings, and the like. That is, the fastening portion 212 can be a set screw that is screwed into the hole 212A such that it makes contact with an outer surface of the channel 112 and through a compressive force holds the channel 112 in place. In some embodiments, the channel 112 can have a detent, depression or groove in its outer surface that aligns with the hole 212A so that a tip of the fastening portion 212 engages wi the detent, groove, or depression to aid in holding the tube 112 in a secure manner. In other exemplary embodiments, the outer surface of the tube 112 can have threads which mechanical mate with threads on the inner surface of the cavity 204. Of course, other suitable mechanical connections can also be used.

FIG. 3 is a side cross-sectional view of an exemplary contact tip assembly 300 of the present invention, where an extension tube 112 is fastened to the contact tip 108 shown in FIG. 2. Specifically, FIG. 3 shows the extension tube 112 is secured inside the cavity 204 of the body portion 108 using fastening portion 212. In an exemplary embodiment, the hole 212A comprises a threaded hole extending from an outer wall 220 of the body portion 108 and to the cavity 204. The threaded hole, for example, can be disposed at a non-perpendicular angle with respect to an axis AA and can receive a set screw that secures the extension tube 112 to the body portion 108. In some embodiments, the threaded hole can be disposed perpendicular to the axis. The extension tube 112 enables passage of the welding wire (not shown) significantly past the second end 110 of the tip 108. That is, embodiments of the present invention can achieve stick out which is significantly higher than any known torch/contact tip assembly. The channel 208 is aligned with a channel 114 in the extension tube 112 to enable passage of the welding wire through the body portion 108, and to the work piece W. Although not shown, the channel 114 can have a curved or angled edge at is proximate end which mates with the exit of the channel 208. This ensure that if a slight misalignment is present the wire will still easily transfer from the channel 208 to the channel 114. In exemplary embodiments, the extension tube 112 can be cylindrically shaped having a length, an inner diameter, and an outer diameter. Of course, other outer shapes can also be used as desired. Of course, it should be understood that to the extent a consumable with a circular cross-section is used the inner diameter of the extension tube should also be circular, and should be sized similar to the diameter of the bore 208 in the contact tip to allow for proper passage of the consumable.

In exemplary embodiments, the length of the extension tube 112 is such that the exit 113 of the tube is a distance D from the distal end 110 of the contact tip 108, where D is in the range of 1.5 to 8 to inches. For example, in exemplary embodiments, the distance D is in the range of 4 to 6 inches. In exemplary embodiments, the diameter of the channel 114 ranges from 0.02 to 0.0625 inches, and can be the same diameter of the channel 208 so as to accommodate the same wire size as the tip 108. The outer diameter of the extension tube 112 should be selected so that the tube remains stable during operation, but can still fit within the gap of the welding/joining operation. In other exemplary embodiments, the outer diameter of the tube 112 can vary, as shown in the embodiment discussed below.

Figure 4:
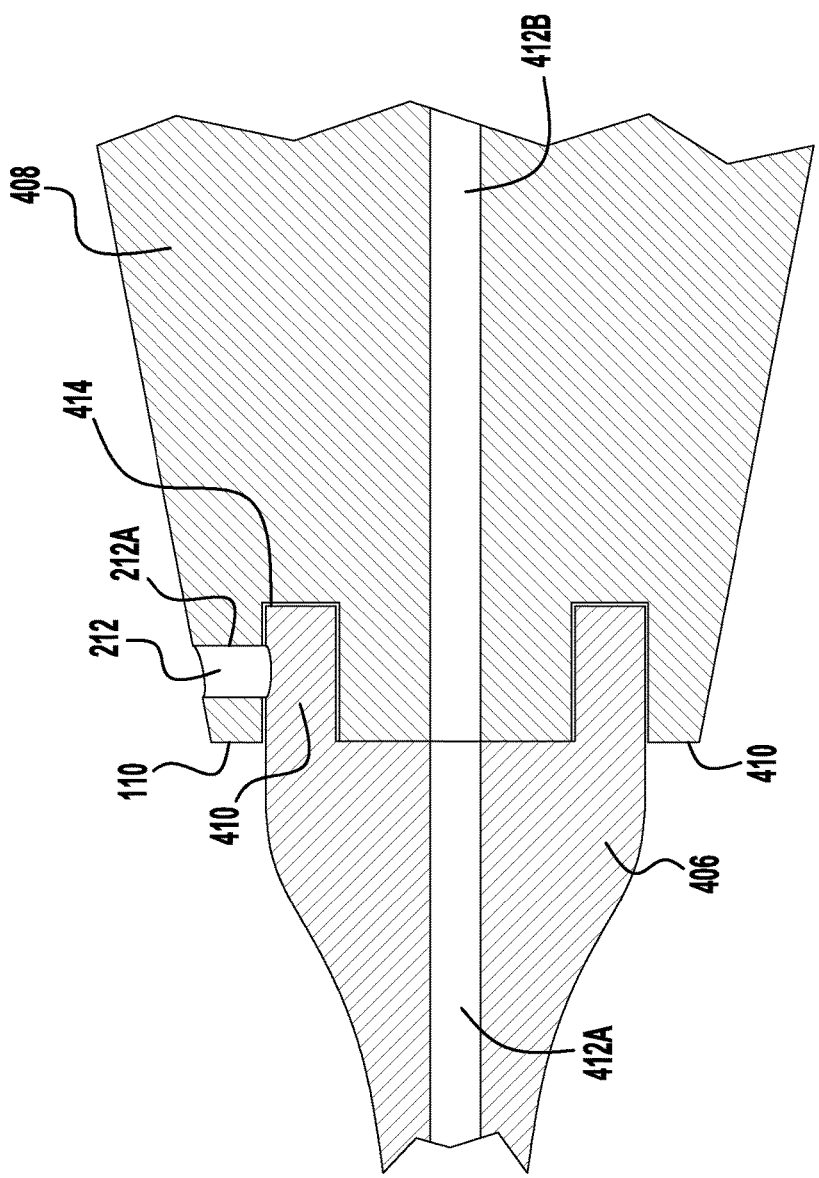
FIG. 4 illustrates a side cross-sectional view of a different embodiment of a welding assembly showing an extension tube fastened to the contact tip.

FIG. 4 illustrates a side cross-sectional view of a different embodiment of a welding assembly showing an extension tube fastened to the contact tip. Specifically, the embodiments of the extension tube and the contact tip in FIG. 4 are different from the embodiments of the extension tube and the contact tip shown in FIGS. 2 and 3. For example, in this embodiment, there is no cavity at the center of the distal end of the contact tip 408, but the channel 412B of a contact tip 408 extends to the second end 110 as shown. This allows for the contact tip 408 to be used independently of the extension tube 406. In some exemplary scenarios, it will be understood and appreciated that instead of the extension tube 112, the extension tube 406 can also be used in the welding system 100 of FIG. 1. One such scenario can be when the welder needs to switch from narrow groove welding to regular hot-wire or arc welding or vice versa. The contact tip 408 can be used for regular welding and the extension tube 406 can be easily attached when desired. As seen in FIG. 4, the extension tube 406 has a joining portion 410 that can be received by recessed portion 414 inside the body portion 408 as shown in FIG. 4. In some embodiments, the recessed portion 414 is a ring-shaped cavity disposed radially around a center axis of contact tip 400, and the joining portion is a male version of the ring shaped cavity which can be inserted into the recessed portion 414. Further, the extension tube 406 includes a channel 412A that aligns with channel 412B passing through the body portion 408. The channel 412B extends from the distal end 110 to the proximal end (not shown) of the tip 408. Similar to the previously discussed embodiment, a fastening portion 212 is provided within the tip 408 for securing the extension tube 406 to the tip 408.

Of course, different connection mechanisms can be used, and the shape and size of the protrusion portion 410 can vary without departing from the spirit and scope of the present invention. For example, a plurality of projections or protrusions can be used, instead of a ring. Also, as shown, the exterior shape of the tube 406 can be varied so as to ensure proper connection with the contact tip 408. For example, the proximal end of the tube 406 can have a larger outer diameter than that of the distal end of the tube 406.

FIG. 5 illustrates a side cross-sectional view of a different embodiment of a welding assembly 500 showing a contact tip including a heating mechanism. Specifically, FIG. 5 demonstrates a welding wire 116 passing through a contact tip 504 and a heating mechanism 524 covering a portion of the extension tube 516. In some embodiments, the contact tip 504 and heating mechanism 524 are separate components. In other embodiments, the heating mechanism 524 is an integral part of contact tip 504. In an exemplary embodiment, the heating mechanism 524 can include induction coils 528 (e.g., covered inside a sheath) for heating the welding wire 116 passing through the extension tube 516. A fastening portion 508 is provided within the contact tip 504. The fastening portion 508 secures the extension tube 516 to the contact tip 504. Further, it is shown in FIG. 5, that the contact tip 504 comprises a channel 512 passing through the tip 504 from the proximate end 530 to the distal end 526. Also shown is a cavity 520 included within the distal end of the tip 504 extending partially from the second end 526 into the tip 504 for receiving the extension tube 516—similar to that shown in FIG. 2. It will be noted that the heating mechanism 524 can be included in the contact tip embodiments discussed in connection with FIGS. 2, 3, 4 and 6. In exemplary embodiments, the heating mechanism 524 is coupled to a power source which provides a current which heats the coils 528. The coils then heat the tube 516 and thus the wire 116 through induction heating (or any other similar heating process) to ensure that the heat loss in the wire is minimal. This can aid in ensuring a proper deposition process in hot-wire applications—particularly when the length of the tube 516 is long.

FIG. 6 depicts another exemplary embodiment of a contact tip assembly of the present invention. In this embodiment a support sleeve 601 is utilized to aid in securing the tube 112 to the contact tip 108. Because the length of the tube can be long, it can be susceptible to breakage or being undesirably repositioned with inadvertent contact. The support sleeve 601 has a cavity 602 into which the distal end of the tip 108 is inserted such that the walls of the cavity 602 make contact with an outer surface of the contact tip 108. Further, the sleeve 601 has a channel 604 through which the tube 112 passes. Thus, the sleeve 601 contacts each of the tube and the contact tip to provide some additional rigidity to the connection. Of course, the sleeve 601 should not be a design which interferes with a deep, narrow groove welding operation. Thus, the support sleeve 601 can be used to provide additional physical support to the tube 112, and can be used with any of the above discussed and shown embodiments, and can be made from either a conductive or non-conductive material depending on the application. Moreover, the sleeve 601 can be secured the tip 108 via any know mechanical means. For example, the sleeve 601 can use a set screw connection similar to that discussed above.

In further exemplary embodiments, the sleeve 601 can also be used to secured the tube 112 to the contact tip 108. For example, as shown in FIG. 6, the tube 112 has a projection portion 603 which extends outward from the outside wall of the tube 112. The cavity 602 of the sleeve 601 has a distal surface 607 internal to the cavity which contacts the projection portion 603 and when assembled holds the projection portion 603 against the distal end 110 of the tip 108. For example, as shown the contact tip 108 and sleeve 601 can have matching threaded surfaces which allow the sleeve 601 to be threaded onto the outside of the tip 108 so that the tube 112 is pulled to and secured against the distal end 110 of the tip 108. The projection portion 603 can be integral with the wall of the tube and can be shaped as needed to provide a secure connection. For example, the portion 603 can be a ring around the outer wall of the tube 112, or can be a plurality of discrete projections that interlock with corresponding grooves in the sleeve 601. Of course, other connection types can be used without departing from the spirit or scope of the present invention.

Comprise, include, and/or plural forms of each are open ended and include the listed parts and can include additional parts that are not listed. And/or is open ended and includes one or more of the listed parts and combinations of the listed parts.

As stated above, although the majority of the discussion in the present application has been discussed within the context of welding systems and applications, these discussions were exemplary. In other words, while the invention has been particularly shown and described with reference to exemplary embodiments thereof, the invention is not limited to these embodiments. For example, the fastening of the extension tube to the contact tip can be based on press fit or friction fit mechanisms, rather than those discussed above. Thus, it will be understood by those of ordinary skill in the art that various changes in form and details may be made therein without departing from the spirit and scope of the invention as defined by the following claims.

The invention claimed is:

1. A contact tip assembly, comprising:
    a contact tip comprising,
        a body portion having a first end to operably connect to a welding torch, and a second end that is opposite the first end along an axis running through the body portion,
        a cavity in the body portion extending from the second end into the body portion, and
        a channel passing through the body portion along the axis from the first end to the cavity for passage of a wire; and
    a non-electrically conductive extension tube inserted into said cavity and coupled to said contact tip,
    wherein said non-electrically conductive extension tube has a channel which aligns with said channel of said body portion when said extension tube is inserted into said cavity.

2. The contact tip assembly of claim 1, wherein the extension tube has an outer diameter such that the wire can be fed to a bottom of a joint during a wire deposition operation in which the joint is narrower than a smallest diameter of said contact tip.

3. The contact tip assembly of claim 1, wherein the cavity extends into the body portion along the axis such that a distal end of said channel ends upstream of said second end of said contact tip.

4. The contact tip assembly of claim 1, wherein the cavity is a ring-shaped cavity that extends into the body portion, the ring-shaped cavity disposed radially around the axis.

5. The contact tip assembly of claim 1, wherein the body portion comprises a hole for accepting a fastening portion to secure the extension tube to the body portion.

6. The contact tip assembly of claim 5, wherein the hole is a threaded hole extending from an outer wall of the body portion and to the cavity, and the fastening portion is a set screw that secures the extension tube to the body portion.

7. The contact tip assembly of claim 6, wherein the threaded hole is disposed at an angle with respect to the axis.

8. The contact tip assembly of claim 6, wherein the threaded hole is disposed perpendicular to the axis.

9. The contact tip assembly of claim 1, wherein the extension tube is ceramic.

10. The contact tip assembly of claim 1, further comprising a heating mechanism that is disposed over the extension tube to heat the wire.

11. The contact tip assembly of claim 10, wherein the heating mechanism includes an induction coil.

12. The contact tip assembly of claim 1, wherein a length of the cavity ranges from 0.25 to 0.75 inches.

13. The contact tip assembly of claim 1, wherein a length of the extension tube from said second end of said contact tip to a distal end of said extension tube is in the range of 1.5 to 8 inches.

14. The contact tip assembly of claim 1, wherein a diameter of the channel of the extension tube ranges from 0.02 to 0.0625 inches.

15. The contact tip assembly of claim 1, wherein an outer surface of the extension tube has a non-circular cross-section.

16. A contact tip for use in a hot wire welding torch, the contact tip comprising:

a body portion having a first end to operably connect to said hot wire welding torch, and a second end that is opposite the first end along an axis running through the body portion;

a cavity in the body portion to receive an extension tube that guides a welding wire past the second end of the body portion, the cavity extending from the second end and partially into the body portion; and a channel passing through the body portion along the axis from the first end to one of the second end or the cavity for passage of a welding wire; and a non-electrically conductive extension tube inserted into said cavity and coupled to said contact tip, wherein said non-electrically conductive extension tube has a channel which aligns with said channel of said body portion when said extension tube is inserted into said cavity.

17. The contact tip for claim 16, wherein the body portion comprises a hole for accepting a fastening portion to secure the extension tube to the body.

18. The contact tip of claim 17, wherein the hole is a threaded hole extending from an outer wall of the body portion and to the cavity, and the fastening portion is a set screw that secures the extension tube to the body portion.

19. The contact tip of claim 16, wherein the cavity extends into the body portion along the axis.

20. The contact tip of claim 16, wherein the cavity is a ring-shaped cavity that extends into the body portion, the ring-shaped cavity disposed radially around the axis such that the distal end of said channel of said body portion is coplanar with said second end of said body portion.

* * * * *